(12) United States Patent
Cho et al.

(10) Patent No.: US 7,224,132 B2
(45) Date of Patent: May 29, 2007

(54) PORTABLE RANGE EXTENDER OPERABLE IN AUTOMATIC AND MANUAL MODES

(75) Inventors: Chahee Peter Cho, Centreville, VA (US); Eun S. Kim, Centreville, VA (US)

(73) Assignee: Wavecrest Laboratories, LLC., Rochester Hills, MI (US)

( * ) Notice: Subject to any disclaimer, the term of this patent is extended or adjusted under 35 U.S.C. 154(b) by 30 days.

(21) Appl. No.: 10/761,313

(22) Filed: Jan. 22, 2004

(65) Prior Publication Data

US 2005/0162106 A1    Jul. 28, 2005

(51) Int. Cl.
  *H02P 1/00*    (2006.01)
(52) U.S. Cl. ............................ 318/139; 290/9; 290/17; 320/136; 320/149; 180/65.1
(58) Field of Classification Search ................ 318/139; 290/9, 17, 45, 50; 320/136, 149; 180/65.1, 180/65.3
  See application file for complete search history.

(56) References Cited

U.S. PATENT DOCUMENTS

| | | | | |
|---|---|---|---|---|
| 3,719,881 A | * | 3/1973 | Shibata et al. | ................ 322/11 |
| 4,165,795 A | * | 8/1979 | Lynch et al. | ............... 180/65.2 |
| 4,199,037 A | | 4/1980 | White | |
| 5,081,365 A | * | 1/1992 | Field et al. | ................... 290/45 |
| 5,264,764 A | | 11/1993 | Kuang | |
| 5,898,282 A | | 4/1999 | Drozdz et al. | |
| 6,333,620 B1 | | 12/2001 | Schmitz et al. | |
| 6,622,804 B2 | | 9/2003 | Schmitz et al. | |
| 6,651,759 B1 | | 11/2003 | Gruenwald et al. | |
| 6,745,117 B1 | * | 6/2004 | Thacher et al. | ............... 701/50 |
| 2002/0123836 A1 | | 9/2002 | Komiyama et al. | |

FOREIGN PATENT DOCUMENTS

| | | |
|---|---|---|
| DE | 40 32 606 A1 | 3/1992 |
| DE | 196 41 254 A1 | 4/1998 |
| EP | 0 695 521 A1 | 2/1996 |
| EP | 1 329 351 A1 | 7/2003 |
| GB | 1129709 | 10/1968 |
| WO | WO 00/74964 A1 | 12/2000 |

* cited by examiner

*Primary Examiner*—Rina Duda
(74) *Attorney, Agent, or Firm*—Proskauer Rose, LLP

(57) ABSTRACT

A portable range extender is provided for an electric vehicle having a vehicle controller, and an electric traction motor powered by a battery. The portable range extender has an engine, a dynamoelectric machine coupled to the engine by a shaft and electrically connectable to the vehicle, and a range extender controller for controlling operations of the range extender independently of the vehicle controller. The range extender controller monitors voltage of the battery to automatically activate the range extender when the battery voltage is less than a first threshold value and automatically deactivate the range extender when the battery voltage reaches a second threshold value. The dynamoelectric machine operates as a motor for starting the engine when the battery voltage is less than the first threshold value. In response to prescribed engine conditions, the range extender controller operates the dynamoelectric machine as a generator driven by the engine to generate electric power supplied to the vehicle.

24 Claims, 5 Drawing Sheets

PORTABLE RANGE EXTENDER OPERABLE IN AUTOMATIC AND MANUAL MODES

FIELD OF THE INVENTION

The present invention relates to electric power supply devices, and more particularly, to a portable stand-alone electric power supply device operable as a range extender for electric vehicles.

BACKGROUND ART

A typical range extender is an integral part of a hybrid electric vehicle provided to improve its travel range. For example, U.S. Pat. No. 5,264,764 discloses a hybrid electric vehicle comprising an inverter/motor electric drive system, a vehicle controller, a range extender and a traction battery. The inverter/motor electric drive system is composed of an electric motor and an inverter/motor control unit. In response to a torque command signal generated by a vehicle controller in accordance with a position of a hand or foot actuated speed control actuator, the electric motor produces a rotary output transmitted to road engaging wheels through a transmission. The range extender including an internal combustion engine and an alternator is actuated by a vehicle controller to provide electric power to the inverter/motor drive system and/or the traction battery. The internal combustion engine rotationally drives the alternator that outputs electric power applied to recharge the traction battery or directly to the motor. The inverter/motor control unit is responsive to the torque command signal to provide electric power from the traction battery and/or the range extender to the electric motor sufficient to drive the vehicle at a desired speed.

When the vehicle is coasting, a regenerative signal is produced by the vehicle controller to activate the motor as an electrical generator to charge the traction battery. When the motor is in an energy regenerative state, a requested power signal is generated by the vehicle controller to control the power generated by the range extender so that all energy generated by the motor is used to charge the battery. The range extender is controlled by a range extender subroutine called-up by the vehicle controller.

Another example of a range extender incorporated in a hybrid electric vehicle is disclosed in U.S. Pat. Nos. 6,622,804 and 6,333,620, which describe a series type hybrid electric vehicle including electric motors powered by a battery array, vehicle control unit, an internal combustion engine and a generator driven by the internal combustion engine for charging the battery array. The internal combustion engine is controlled by the vehicle control unit to run continuously during operation of the vehicle. The charging of the battery array by the generator is controlled by the vehicle control unit depending on a driving mode of the vehicle, i.e. in accordance with power output, power consumption and rpm of the electric motors. The power generated by the generator is generally maintained constant but may be decreased if the state-of-charge of the battery array approaches an upper control limit at which the battery array may be overcharged, and may be increased if the state-of-charge approaches a lower control limit at which the battery array would be unable to drive the electric motors with enough torque to propel the vehicle.

Hence, a typical range extender is designed specifically for a particular arrangement of a hybrid electric vehicle, in which the range extender is installed. The range extender is controlled by the vehicle controller to interact with the electric motor of the vehicle. In hybrid vehicles, the electric motor is used primarily for low-speed cruising or to provide extra power for acceleration or hill climbing. When braking or coasting to a stop, the hybrid vehicle uses its electric motor as a generator to produce electricity, which is then stored in its battery pack. Therefore, the electric motor in hybrid vehicles improves fuel economy compared to a vehicle equipped only with an internal combustion engine. Unlike all-electric vehicles, which have a limited travel range and create inconvenience for users by requiring frequent recharging at charging cities, hybrid vehicles do not need to be plugged into an external source of electricity to charge batteries.

However, hybrid vehicles present challenges to be addressed in order to be suitable for widespread implementation. A hybrid vehicle is more expensive than an all-electric vehicle. Emissions caused by the internal combustion engine should be minimized or eliminated. Weight and size of a combination of electric motor and internal combustion engine with its fuel supply are important factors in vehicles such as compact cars and trucks.

Therefore, it would be desirable to create a portable range extender that may be electrically connected to an all-electric vehicle to enable the vehicle to travel longer distances, if necessary. Thus the need exists for a portable range extender operable independently of the controller and motor of an all-electric vehicle. Such a range extender would enable the user to move it from one vehicle to another, and would be able to support vehicles of different types.

Further, to reduce emissions and improve fuel efficiency, it would be desirable to control a portable range extender so as to turn on and off its engine in an automatic mode depending on the voltage of the vehicle battery being charged by the range extender. To make the range extender more user friendly, it would be desirable to control it so as to combine its automatic mode operations with operations in a manual mode enabling the user to perform monitoring and testing of the range extender.

DISCLOSURE OF THE INVENTION

The present invention fulfills the above described needs, at least in part, by provision of a portable range extender for an electric vehicle having a vehicle controller, and an electric traction motor powered by a battery. The portable range extender comprises an engine, a dynamoelectric machine coupled to the engine by a shaft and electrically connectable to the vehicle, and a range extender controller for controlling operations of the range extender independently of the vehicle controller. The range extender controller monitors voltage of the battery to automatically activate the range extender when the battery voltage is less than a first threshold value and automatically deactivate the range extender when the battery voltage reaches a second threshold value.

In accordance with one aspect of the invention, the range extender controller may be configured to operate the dynamoelectric machine as a motor for starting the engine when the battery voltage is less than the first threshold value. In response to prescribed engine conditions, the range extender controller may operate the dynamoelectric machine as a generator driven by the engine to generate electric power supplied to the vehicle.

In accordance with a further aspect of the invention, a power conversion circuit may be controlled by the range extender controller to operate as an inverter to convert DC power supplied by the battery to AC power required to operate the dynamoelectric machine in a motoring mode. When the dynamoelectric machine operates as a power generator, the range extender controller may switch the power conversion circuit into a converter mode to convert the AC power generated by the dynamoelectric machine into DC power used for charging the battery or driving the traction motor.

In accordance with another aspect of the invention, the range extender controller may be configured to delay activating the range extender by a predetermined waiting period in response to detecting that the battery voltage is less than the first threshold value. The range extender may be activated if after the predetermined waiting period the battery voltage is still less than the first threshold value.

In accordance with a further aspect of the invention, the engine may be automatically turned on when the battery voltage is less than the first threshold value. The engine may be automatically turned off when the battery voltage reaches the second threshold value.

In accordance with another aspect of the invention, the range extender may comprise a mode selection circuit for selecting between an automatic operating mode and a manual operating mode. In the automatic mode, the range extender may be automatically activated when the battery voltage is less than the first threshold value and may be automatically deactivated when the battery voltage reaches the second threshold value, and in the manual mode, the range extender may be activated by a user and may be automatically deactivated if the battery voltage reaches the second threshold value.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
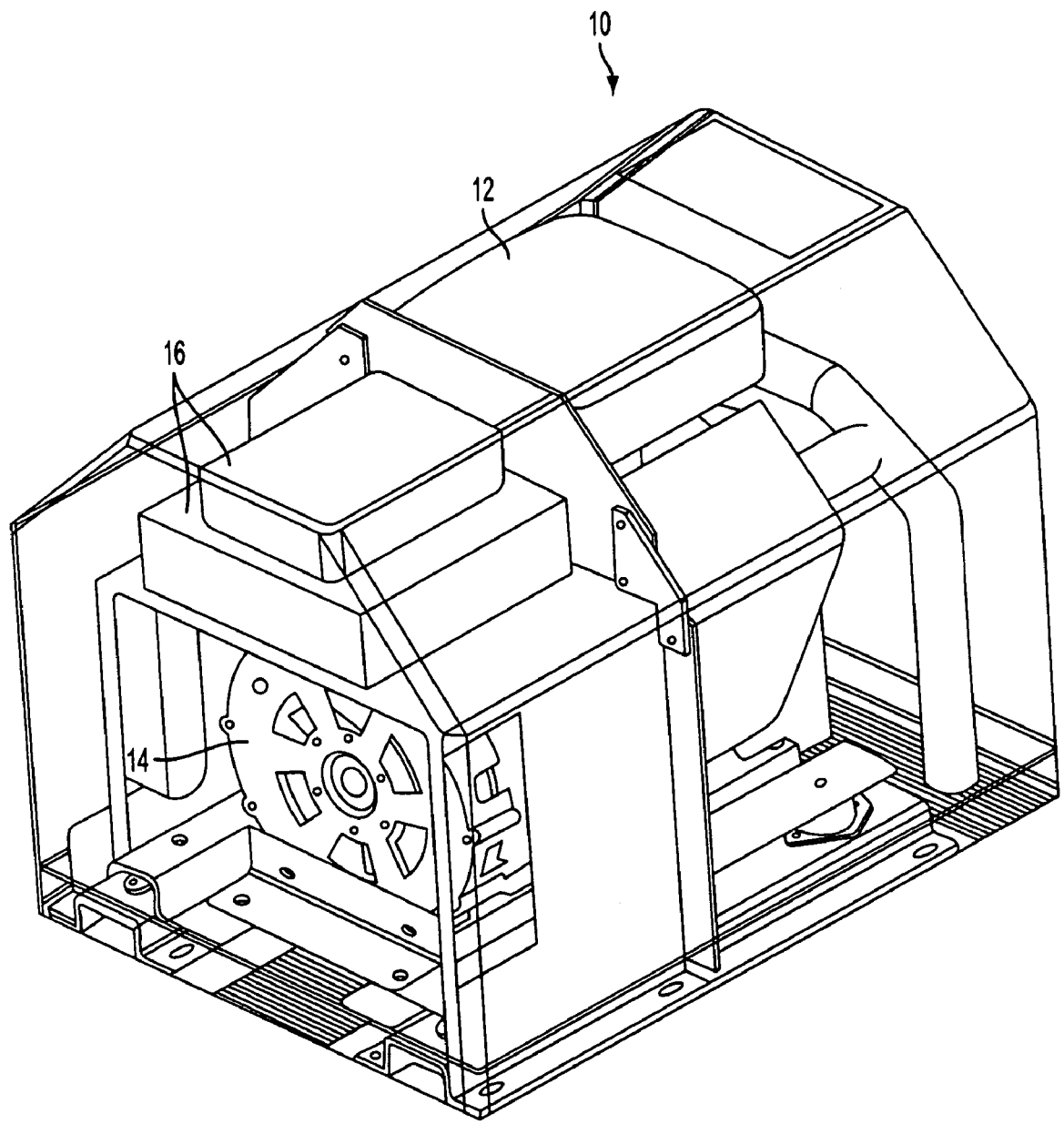
FIG. 1 shows a configuration of the portable range extender of the present invention.

FIG. 1 illustrates an example of a portable range extender 10 of the present invention. The range extender 10 comprises a prime mover 12, such as an internal combustion engine, a dynamoelectric machine 14 coupled to the prime mover 12 by a hollow shaft of the dynamoelectric machine 14, and an electronic control system 16 for controlling operations of the prime mover 12 and the dynamoelectric machine 14. As described in more detail hereinafter, the dynamoelectric machine 14 is controlled to operate as a motor for starting the engine 12 when the engine 12 is turned on. When prescribed engine conditions are detected, the control system 16 controls the dynamoelectric machine 14 to operate as a generator driven by the engine 12 to produce electrical power supplied to an external load, such as an all-electric vehicle. The dynamoelectric machine 14 may be a 3-phase AC electric machine including a stator with a shaft, a rotor and a housing.

Figure 2:
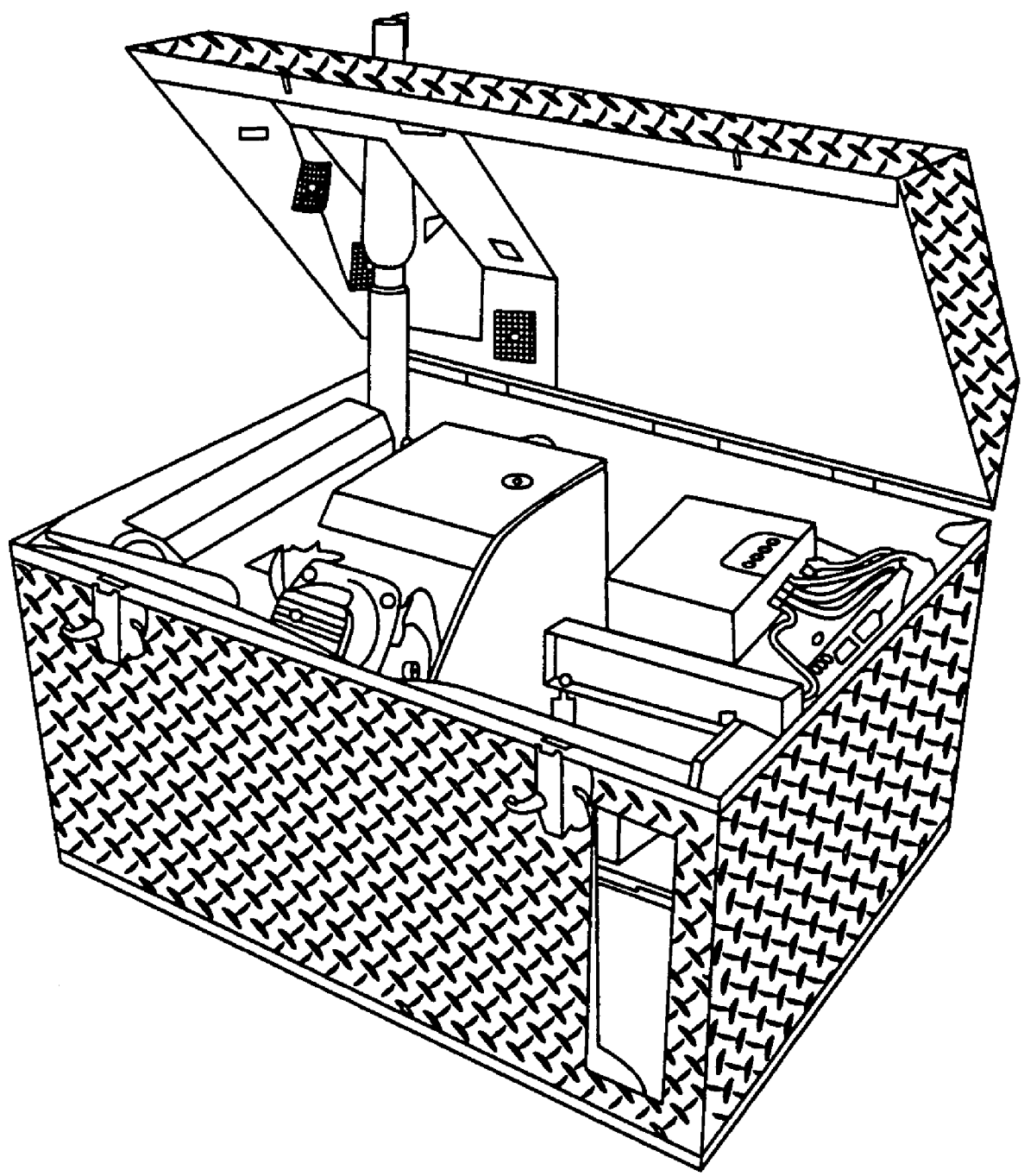
FIG. 2 illustrates packaging of the range extender of the present invention.

Dynamoelectric machine 14 not only eliminates the need for a starter motor, but the bulk of the device renders a separate flywheel unnecessary. Thus, the range extender 10 may be packaged in a compact integrated assembly covered by an enclosure, as illustrated in FIG. 2. This compact structure enables a user to place the portable range extender into any battery-powered vehicle in order to extend its travel range by charging its battery or driving the vehicle instead of or in combination with the electric motor. For example, the range extender 10 may be placed in all-electric buses or vans to enable their use for longer trips. Also, the range extender 10 may be mounted in a trailer carried by an all-electric vehicle. In addition to the travel range extension applications, the range extender of the present invention may act as an auxiliary power unit for loads with substantial power consumption, such as trucks, recreational vehicles, etc.

Figure 3:
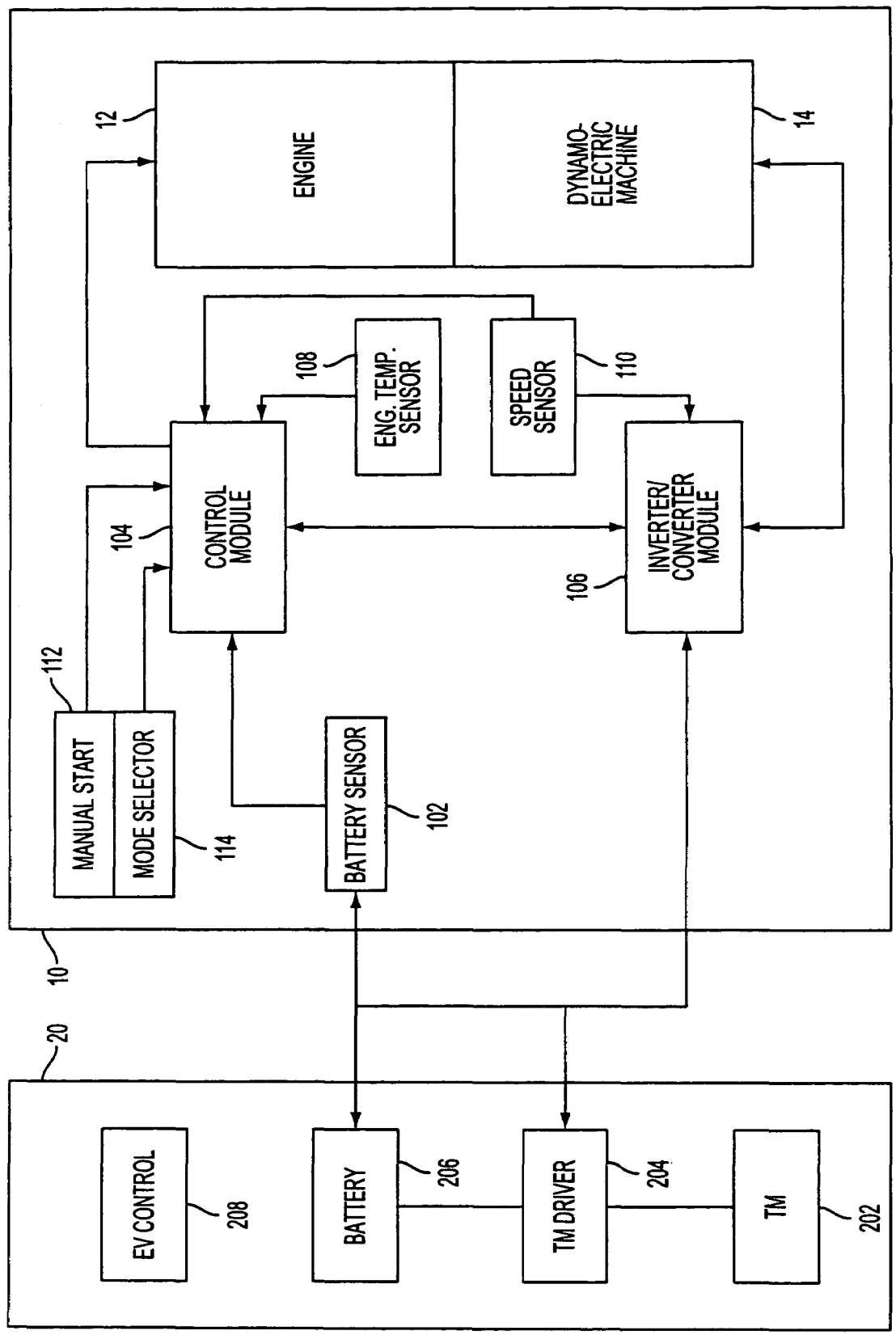
FIG. 3 is a block diagram illustrating a range extender control system of the present invention.

FIG. 3 is a block diagram of an exemplary embodiment of the present invention, in which the range extender 10 is detachably connectable to a battery-powered vehicle 20 having a traction electric motor (TM) 202 driven by a TM driver 204 and powered by an electric battery 206. The traction motor 202 may be a permanent magnet DC brushless motor energized by the high-voltage battery 206 that can provide substantial electric power, for example, about 65 KW. Also, the vehicle 20 may include an electric vehicle (EV) controller 208 for controlling operations of the vehicle 20. In response to a torque request, the EV controller 208 may control the TM driver 202 to provide sufficient electric power from the battery 206 to the motor 202 to achieve the desired torque. Also, the EV controller may control the motor 202 to act as an electric generator charging the battery 206 during a regeneration mode.

The range extender 10 has a battery voltage sensor 102 detachably connectable to the vehicle 20 for sensing the voltage of the battery 206. As discussed in more detail hereinafter, when the voltage at the battery 206 is less than a predetermined minimum threshold value, the range extender may be activated automatically to charge the battery 206. The electronic control system 16 includes a control module 104 and an inverter/converter module 106. The control module 104 is supplied with signals representing parameters of the engine 12 and the dynamoelectric machine 14, such as an engine temperature signal provided by an engine temperature sensor 108 to indicate the temperature of the engine 12, and an engine/machine speed signal provided by a speed sensor 110 to indicate the rotational speed of the engine 12 and the dynamoelectric machine 14 coupled to the engine 12 by a shaft. Also, the control module 104 is supplied with user command signals controlling operations of the range extender 10. For example, a manual start switch 112 may provide a manual start command for operating the range extender 10 in a manual mode. A mode selector 114 is provided for switching the range extender 10 between an automatic mode and a manual mode. The control module 104 may be implemented as a microcontroller programmable to control operations of the range extender 10.

The inverter/converter module 106 controlled by the control module 104 is detachably connectable to the vehicle 20 to provide a bidirectional pass for transferring power either from the battery 206 to the dynamoelectric machine 14 operating in the motoring mode to initiate operation of the engine 12, or from the dynamoelectric machine 14 operating in the generating mode to the battery 206. In particular, the inverter/converter module 106 operates as an inverter to convert DC power from the battery 206 into 3-phase AC power for rotating the dynamoelectric machine 14 in the motoring mode, or as a converter for converting 3-phase AC power generated by the dynamoelectric machine in the generating mode into DC power used for charging the battery 206 or driving the traction motor 202. The control module 104 controls switching the inverter/converter module 106 between the inverter mode and the converter mode.

When the mode selector 114 is in an automatic mode state, the range extender 10 is automatically activated when the voltage $V_B$ at the battery 206 of the vehicle 20 is less than a predetermined minimum value Vmin, which may represent a pre-selected state of battery's charge, for example, 30% of its fully charged value. The battery voltage value lower than Vmin indicates that the vehicle 20 requires an additional power to continue its current operations, for example, to deliver the required torque or to maintain its speed at a requested level. Further, in the automatic mode, the range extender 10 is automatically deactivated when the battery voltage $V_B$ reaches a predetermined maximum value Vmax representing a pre-selected state of battery's charge near its fully charged value.

In particular, when the control module 104 detects that the battery voltage $V_B$ is less than the minimum value Vmin, it produces an engine turn-on signal supplied to the inverter/converter module 106 to turn on the engine 12. In response to the engine turn-on signal, the inverter/converter module 106 operates as an inverter to convert DC power supplied by the battery 206 to 3-phase AC power required to operate the dynamoelectric machine 14 in a motoring mode. The dynamoelectric machine 14 supplied by the AC power produced by the inverter/converter module 106 acts as a starting motor for starting the engine 12.

When the control module 104 detects that the engine 12 rotated by the dynamoelectric machine reaches a rotational speed optimum for starting the engine, and the engine temperature reaches a predetermined optimum temperature, the control module 104 provides the inverter/converter module 106 with an inhibit signal to stop supplying the dynamoelectric machine 14 with the DC power. Also, the control module 104 provides the engine 12 with a fuel solenoid activation signal to activate a fuel solenoid supplying fuel to the engine 12 so as to enable the engine 12 to operate without force applied by the dynamoelectric machine 14.

The optimum rotational speed for starting the engine, and the optimum engine temperature may be selected to minimize engine emission. Cold ambient temperature causes higher engine emission during engine starting operations. Therefore, the fuel supply may be conserved until the engine temperature reaches an optimum level. As the dynamoelectric machine 14 is utilized as a starting motor, the engine 12 may be rotated at a higher speed than available with a conventional starter motor to speed up the warming of the engine. As a result, the pollution caused by emission during the engine start-up is substantially reduced.

When the control module 104 detects that the engine speed reaches a level optimum for generating power, which may be higher than the speed optimum for starting the engine, the control module 104 provides the inverter/converter module 106 with a generating signal to indicate that the engine speed is sufficiently high to enable the dynamoelectric machine 14 to act as a power generator. In response to the generating signal, the inverter/converter module 106 is switched into a converter mode to convert the 3-phase AC power generated by the dynamoelectric machine 14 into DC power used for charging the battery 206 or driving the traction motor 202.

The dynamoelectric machine 14 operates as a generator for charging the battery 206 until the battery voltage $V_B$ reaches a predetermined maximum voltage level Vmax, which may represent, for example, the state of the battery's charge near the fully charged state. When the control module 104 determines that the battery voltage $V_B$ reaches the level Vmax, it produces an engine turn-off signal to turn off the engine 12.

Figure 4:
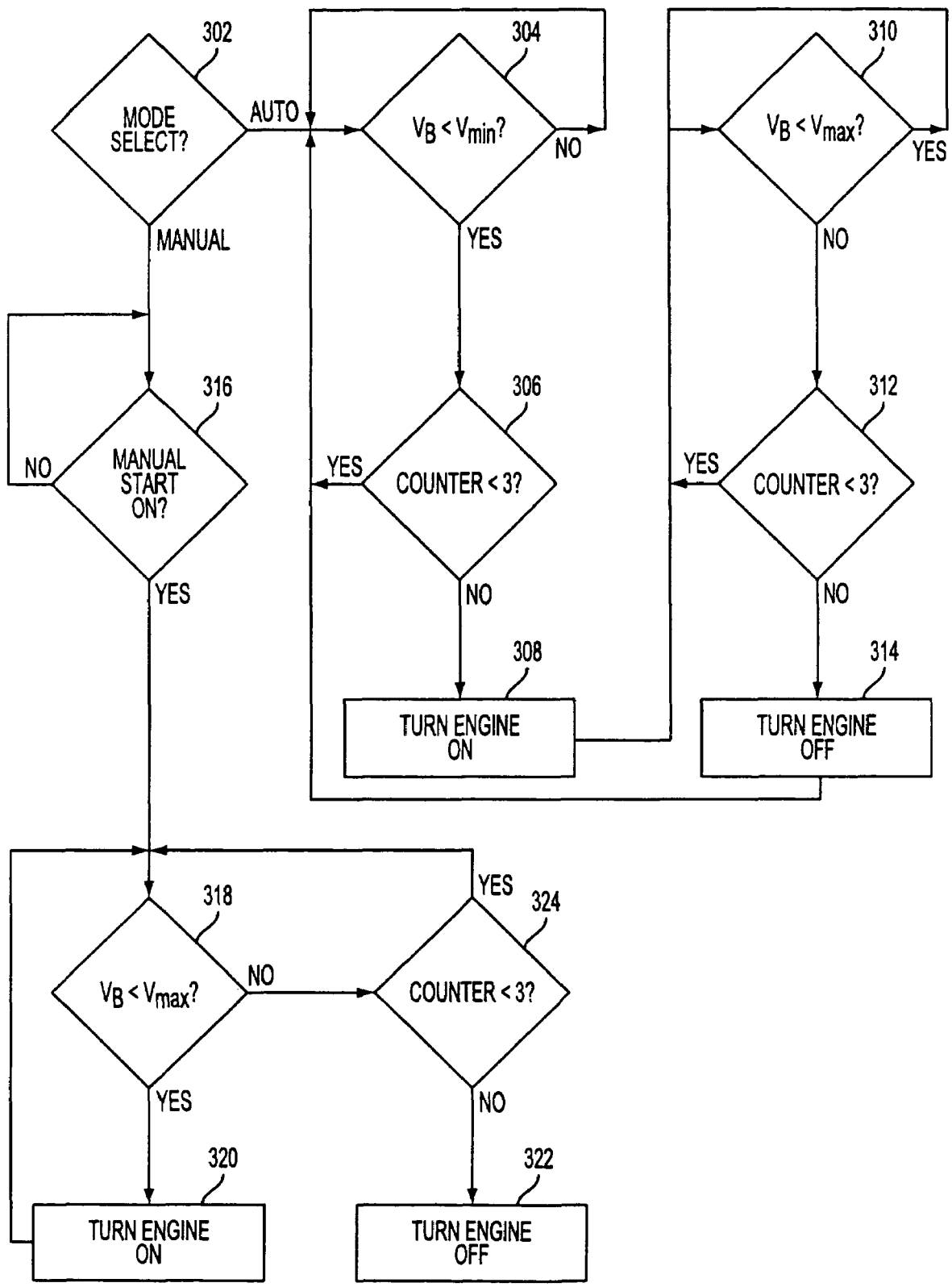
FIG. 4 is a flow chart illustrating range extender control operations in automatic and manual modes in accordance with the present invention.

FIG. 4 is an exemplary flow chart illustrating operations of the range extender 10. When the control module 104 initiates a range extender control procedure, it checks the state of the mode selector 114 (step 302). At this time range extender operation has not yet been initiated. If the mode selector 114 is in an automatic mode state, the control module 104 determines whether the voltage $V_B$ is lower than Vmin (block 304). If not, the procedure reverts again to step 304.

If the voltage $V_B$ is lower than Vmin, operation proceeds to step 306. The purpose of this step is to ensure that the low value of the battery voltage is not detected erroneously due to noise or glitch caused by vehicle operations. For example, acceleration of an electric vehicle may result in a false reading of a battery voltage value by the battery sensor 102 of a voltage value lower than the actual battery voltage value. As soon as the vehicle acceleration is over, the sensed battery voltage increases to reflect the actual battery voltage.

To prevent the range extender from starting when an erroneous low battery voltage is sensed, the control module 104 performs a hysteresis procedure to corroborate battery voltage readings. In particular, if the control module 104 determines that the battery voltage $V_B$ is less than Vmin, it delays activation of the engine 12 by a waiting period, e.g. 10–15 sec. During the waiting period, the control module 104 continues to compare the battery voltage $V_B$ with the minimum value Vmin. The waiting period, for example, may be set counting a predetermined number of voltage sensing operations made at regular intervals. For example, step 306 is illustrated as counting up to three cycles in which $V_B$ is compared with Vmin.

If at the end of the waiting period, the battery voltage $V_B$ remains at a level lower than Vmin and has been sensed at that level in each of the three comparisons at step 304, the control module 104 issues the engine turn on signal at step 308 to activate the engine 12 in the manner discussed above. However, if during the waiting period, the control module 104 detects that the voltage battery $V_B$ is not less than the voltage Vmin, the process reverts to step 304 and the engine 12 remains turned off.

Hence, the hysteresis procedure prevents the engine 12 from being turned on unnecessarily when the battery voltage is at an acceptable level due to noise or glitch in the battery voltage readings. The starting of an engine causes an especially high level of pollution due to harmful emission. Therefore, the hysteresis procedure substantially reduces pollution caused by the range extender 10.

As illustrated in FIG. 4, the hysteresis procedure may be implemented using a program counter in the control module 104. If the control module 104 detects that the battery voltage $V_B$ is less than the voltage Vmin, the program counter performs a predetermined number of counting cycles (block 306). For example, FIG. 4 illustrates performing three counting cycles, each of which may have a duration of 3–5 sec. However, one skilled in the art would realize that any appropriate number of counting cycles may be selected. At the end of each counting cycle, the control module 104 compares the value of the battery voltage $V_B$ provided by the battery sensor 102 with the voltage Vmin. If the voltage $V_B$ is less than the voltage Vmin, but the counter value is less than 3 (block 306), the control module 104 does not produce the engine turn on signal. Instead, the range extender control procedure returns to block 304 to continue the battery voltage monitoring. However, if the voltage $V_B$ is less than the voltage Vmin at the end of the third counting cycle (counter value is not less than 3), the control module 104 issues the engine turn on signal to activate the engine (step 308).

When the engine is turned on, the control module 104 compares the battery voltage $V_B$ with the maximum voltage Vmax (step 310). When the control module 104 detects that the voltage $V_B$ reaches the maximum voltage level, it issues the engine turn off signal to deactivate the engine 12. To prevent the engine 12 from being turned off due to noise or glitch in the battery voltage readings, the control module 104 may perform a hysteresis procedure to corroborate the battery voltage readings. Alternatively, the engine may be turned off as soon as the battery voltage $V_B$ reaches the maximum voltage Vmax.

The hysteresis procedure with respect to the maximum voltage Vmax involves delaying deactivation of the engine 12 by a waiting period, e.g. 10–15 sec, if the control module 104 determines that the battery voltage $V_B$ reaches the maximum voltage level. During the waiting period, the control module 104 continues to compare the battery voltage $V_B$ with the maximum voltage level Vmax. If at the end of the waiting period, the battery voltage $V_B$ remains at the Vmax level, the control module 104 issues the engine turn off signal to deactivate the engine 12. However, if during the waiting period, the control module 104 detects that the voltage battery $V_B$ is less than the voltage Vmax, the engine 12 remains turned on. The duration of the waiting period initiated when the voltage battery $V_B$ reaches the maximum voltage Vmax may differ from the duration of the waiting period established when the voltage battery $V_B$ reduces below the minimum voltage Vmin.

The hysteresis procedure with respect to the maximum voltage Vmax may be implemented using a program counter in the control module 104 in the manner similar to the hysteresis procedure performed with respect to the minimum voltage Vmin. If the control module 104 detects that the battery voltage $V_B$ reaches the voltage Vmax, the program counter performs a predetermined number of counting cycles (step 312). For example, FIG. 4 illustrates performing 3 counting cycles, each of which may have a duration of 3–5 sec. However, one skilled in the art would realize that any appropriate number of counting cycles may be selected. At the end of each counting cycle, the control module 104 compares the value of the battery voltage $V_B$ provided by the battery sensor 102 with the voltage Vmax. If the voltage $V_B$ reaches the Vmax level, but the counter value is less than 3 (block 312), the control module 104 does not produce the engine turn off signal. Instead, the range extender control procedure returns to block 310 to continue the battery voltage monitoring. However, if the voltage $V_B$ is not less than the voltage Vmax at the end of the third counting cycle (counter value is not less than 3), the control module 104 issues the engine turn off signal to deactivate the engine (block 314).

Figure 5:
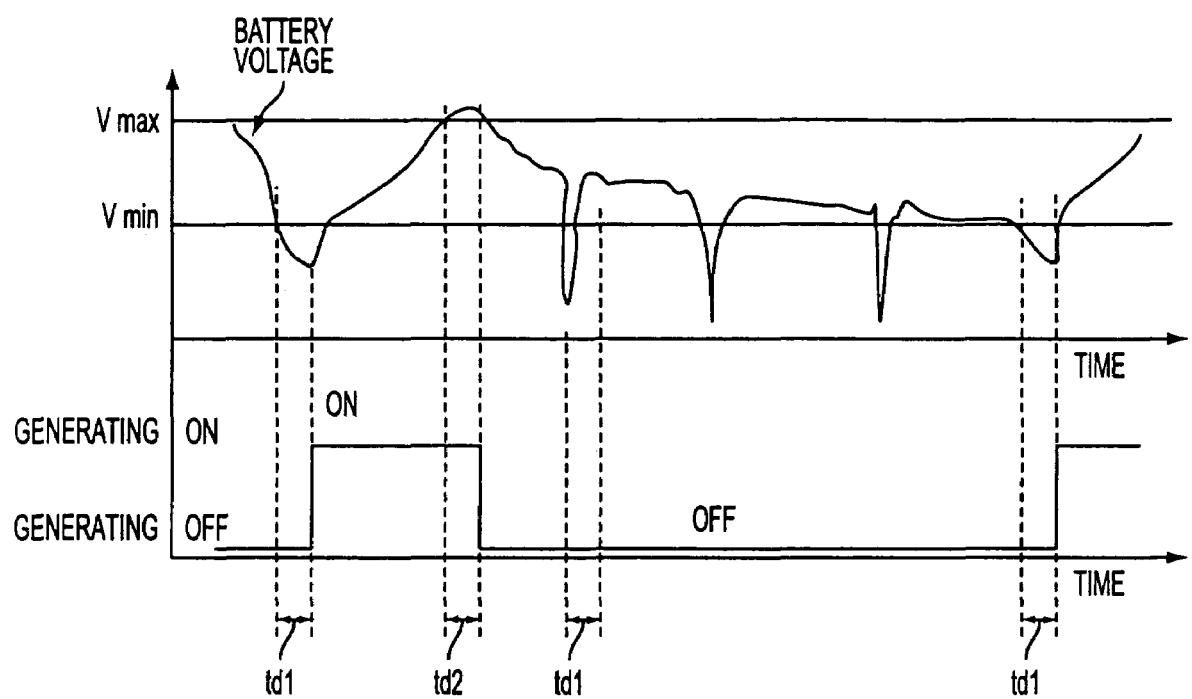
FIG. 5 is a diagram illustrating a hysteresis procedure in accordance with the present invention.

Hence, in the automatic mode of operation, the range extender 10 is controlled to automatically turn on the engine 12 when the battery voltage is less than a predetermined minimum threshold, and to automatically turn off the engine 12 when the battery voltage reaches a predetermined maximum threshold. FIG. 5 is a diagram illustrating turning the engine 12, on and off in the automatic mode using the hysteresis procedure. When the battery voltage reduces below the minimum voltage level Vmin, the control module 104 establishes a waiting period $t_{d1}$. If at the end of the waiting period, the battery voltage remains at a level lower than Vmin, the engine 12 is turned on to generate electric power for recharging the vehicle battery. As illustrated in FIG. 5, such a procedure, prevents the engine 12 from being turned on in response to short-term battery voltage reductions having durations less than the duration of the waiting period. Further, when the battery voltage reaches the maximum voltage level Vmax, the control module 104 turns the engine 12 off only after a waiting period $t_{d2}$. By preventing frequent starting of the engine, the hysteresis procedure substantially reduces pollution caused by harmful emission during the engine start-up.

When the mode selector 114 is in a manual mode state, the range extender 10 operates in a manual mode. In particular, if in step 302, the control module 104 determines that the mode selector 114 is in the manual mode state, the control module 104 checks the state of the manual start switch 112 (step 316). If this switch is not in an active state, the range extender 10 is not activated to recharge the battery 206 even when the battery voltage is less than the minimum voltage Vmin. When the control module 104 detects an active state of the manual start switch 112, the control module 104 compares the battery voltage $V_B$ with the maximum voltage level Vmax (step 318). If the voltage $V_B$ is less than Vmax, the control module 104 produces the engine turn on signal to turn on the engine 12 using the dynamoelectric machine 14 as a starting motor (step 320). Hence, the user is enabled to manually activate the range extender 10. For example, the manual mode of operation may be used for testing or monitoring the range extender 10.

When the engine is turned on in the manual mode of operation, the control procedure returns to step 318 to enable the control module 104 to perform battery voltage monitoring. When the control module 104 detects that the battery voltage $V_B$ is not less than Vmax, it issues the engine turn off signal to automatically turn off the engine (block 322). The hysteresis procedure similar to the procedure performed in the automatic mode may be conducted to prevent turning off the engine due to noise or glitch in the battery voltage readings (step 324). Alternatively, the engine may be turned off as soon as the battery voltage $V_B$ reaches the maximum voltage Vmax. After the engine 12 is turned off in the manual mode, it may be manually activated again when the control module 104 detects the active state of the manual start switch 112.

As discussed above, the range extender 10 is controlled independently of the control system of the vehicle 20. Also, the range extender 10 operates independently of the vehicle's traction motor. As a result, the same range extender 10 may be placed in electric vehicles of different types and may be easily removed from one vehicle and installed into another vehicle.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, it is within the contemplation of the invention that the range extender 10 may be utilized as an electric power source for providing electric power to loads with substantial power consumption, such as trucks, recreational vehicles, etc.

What is claimed is:

1. A portable range extender for an electric vehicle having a vehicle controller, and an electric traction motor powered by a battery, the portable range extender comprising:
an engine,
a dynamoelectric machine coupled to the engine by a shaft and electrically connectable to the vehicle, and
a range extender controller for controlling operations of the range extender independently of the vehicle controller, the range extender controller monitoring voltage of the battery to automatically activate the range extender when the battery voltage is less than a first threshold value and automatically deactivate the range extender when the battery voltage reaches a second threshold value.

2. The portable range extender of claim 1, wherein the range extender further comprises a battery voltage sensor for sensing the battery voltage.

3. The portable range extender of claim 1, wherein the range extender controller is configured to delay activating the range extender by a predetermined waiting period in response to detecting that the battery voltage is less than the first threshold value.

4. The portable range extender of claim 3, wherein the range extender controller is configured to activate the range extender if after the predetermined waiting period the battery voltage is less than the first threshold value.

5. The portable range extender of claim 1, wherein the range extender further comprises a mode selection circuit for selecting between an automatic operating mode and a manual operating mode.

6. The portable range extender of claim 5, wherein in the automatic mode, the range extender is automatically activated when the battery voltage is less than the first threshold value and is automatically deactivated when the battery voltage reaches the second threshold value.

7. The portable range extender of claim 6, wherein in the manual mode, the range extender is manually activated by a user and automatically deactivated when the battery voltage reaches the second threshold value.

8. The portable range extender of claim 5, wherein in the manual mode, the range extender is not activated automatically when the battery voltage is less than the first threshold value.

9. The portable range extender of claim 1, wherein the engine is automatically turned on when the battery voltage is less than the first threshold value.

10. The portable range extender of claim 9, wherein the range extender controller is configured to operate the dynamoelectric machine as a motor for starting the engine when the battery voltage is less than the first threshold value.

11. The portable range extender of claim 10, wherein the range extender controller is responsive to prescribed engine conditions to operate the dynamoelectric machine as a generator driven by the engine to generate electrical power supplied to the vehicle.

12. The portable range extender of claim 10, wherein the engine is automatically turned off when the battery voltage reaches the second threshold value.

13. The portable range extender of claim 11, further comprising a power conversion circuit controlled by the range extender controller to operate as an inverter to convert DC power supplied by the battery to AC power required to operate the dynamoelectric machine as a motor for starting the engine.

14. The portable range extender of claim 13, wherein the power conversion circuit is controlled by the range extender controller to operate as a converter to convert AC power generated by the dynamoelectric machine into DC power supplied to the battery.

15. A range extender for an electric vehicle having a vehicle controller, and an electric traction motor powered by a battery, the range extender comprising:
an engine,
a dynamoelectric machine structurally coupled to the engine by a shaft and electrically connectable to the vehicle,
a battery voltage sensor for sensing voltage of the battery, and
a range extender controller responsive to the sensed voltage battery for delaying activation of the range extender by a predetermined waiting period when the battery voltage decreases below a first threshold value, the range extender controller controlling operations of the range extender independently of the vehicle controller.

16. The range extender of claim 15, further comprising a mode selection circuit for selecting between an automatic mode and a manual operating mode.

17. The range extender of claim 16, wherein the range extender controller is configured to automatically deactivate the range extender when the battery voltage reaches a second threshold value.

18. A portable range extender for an electric vehicle having an electric traction motor powered by a battery, the portable range extender comprising:
an engine,
a dynamoelectric machine structurally coupled to the engine by a shaft and electrically connectable to the vehicle,
a mode selection circuit for selecting between an automatic operating mode and a manual operating mode, and
a range extender controller for controlling operations of the range extender independently of operation of the traction motor, wherein
in the automatic mode, the range extender controller monitors voltage of the battery to automatically activate the range extender when the battery voltage is less than a first threshold value and automatically deactivate the range extender when the battery voltage reaches a second threshold value, and
in the manual mode, the range extender is activated by a user but is automatically deactivated when the battery voltage reaches the second threshold value.

19. A method of controlling a range extender for an electric vehicle having a vehicle controller, and an electric traction motor powered by a battery, the range extender comprising an engine, and a dynamoelectric machine coupled to the engine, the method comprising the steps of:
sensing voltage of the battery,
in response to the sensed battery voltage decreasing below a first threshold value, and independently of the vehicle controller, controlling the operation of the dynamoelectric machine as a motor for starting the engine, and in response to a prescribed engine condition, and independently of the vehicle controller, controlling the operation of the dynamoelectric machine as a generator driven by the engine to generate electrical power supplied to the vehicle.

20. The method of claim 19, further comprising the step of automatically turning off the engine when the sensed battery voltage reaches the second threshold value.

21. The method of claim 19, wherein in response to the sensed battery voltage decreasing below a first threshold value, the step of operating the dynamoelectric machine as a motor for starting the engine is delayed by a first predetermined period.

22. The method of claim 21, further comprising the step of selecting between an automatic operating mode and a manual operating mode.

23. A method of controlling a range extender for an electric vehicle having a vehicle controller, and an electric traction motor powered by a battery, the method comprising the steps of:

sensing voltage of the battery at a first moment of time, if the battery voltage is less than a first threshold value, sensing the battery voltage again after a predetermined waiting period, and if the battery voltage is less than the first threshold value after the predetermined waiting period, and independently of the vehicle controller, automatically activating the range extender.

24. The method of claim 23, further comprising the step of selecting between an automatic operating mode and a manual operating mode.

* * * * *